United States Patent [19]

Usui

[11] Patent Number: 5,271,647
[45] Date of Patent: Dec. 21, 1993

[54] FLARED STRUCTURE FOR CONNECTING METAL PIPES

[75] Inventor: Masayoshi Usui, Numazu, Japan

[73] Assignee: Usui Kokusai Sangyo Kaisha Ltd., Japan

[21] Appl. No.: 952,918

[22] Filed: Sep. 28, 1992

[51] Int. Cl.$^5$ .............................................. F16L 25/00
[52] U.S. Cl. .................... 285/328; 385/334.5; 385/917
[58] Field of Search ................ 285/334.5, 328, 917, 285/903

[56] References Cited

U.S. PATENT DOCUMENTS

| | | | |
|---|---|---|---|
| 795,376 | 7/1905 | Von Stone | 285/328 |
| 3,214,198 | 10/1965 | Peuchmaur | 285/334.5 X |
| 3,265,413 | 8/1966 | Currie | 285/334.5 X |
| 3,628,815 | 12/1971 | King | 285/334.5 X |
| 4,597,596 | 7/1986 | Tozer | 285/917 X |
| 4,907,830 | 3/1990 | Sasa et al. | 285/917 X |
| 5,080,405 | 1/1992 | Sasa et al. | 285/903 X |

FOREIGN PATENT DOCUMENTS

| | | | |
|---|---|---|---|
| 2906317 | 8/1979 | Fed. Rep. of Germany | 285/903 |
| 550298 | 3/1923 | France | 285/328 |
| 2140115 | 11/1984 | United Kingdom | 285/328 |

Primary Examiner—Dave W. Arola
Attorney, Agent, or Firm—Anthony J. Casella; Gerald E. Hespos

[57] ABSTRACT

Herein disclosed is a flared structure which forms one open end of a metal pipe to be connected to one end of a mating joint. The flared structure has at least one deformed elastic wall portion which is formed circumferentially in the vicinity of the open end of the metal pipe. As the open end is clamped and fastened at the connecting time, the deformed elastic wall portion establishes an elastic force for ensuring a stable connection for a long time.

6 Claims, 2 Drawing Sheets

FLARED STRUCTURE FOR CONNECTING METAL PIPES

BACKGROUND OF THE INVENTION

1. Field of the Invention

The present invention relates to a structure for connecting a metal pipe and, more particularly, to an improvement in a flared structure which is formed at one open end of a metal pipe to be connected to one end of a mating joint. The metal pipe has a relatively small diameter and thickness, e.g., a diameter of 20 mm and a thickness of 1.5 mm or less and is generally arranged for oil or air feed passages in an automobile or a variety of machines or apparatus.

2. Description of the Prior Art

A flared structure of this kind for the connection according to the prior art is shown in FIG. 6. In this structure, one open end 11' of a pipe P' to be connected is so flared at 11 that it is formed of a conical wall 12 opened outward merely smoothly. For the connection, the flared structure is fastened and firmly clamped between the pressure receiving seat of a mating joint 13 and the pressure seat of a nut 14.

In this prior art, however, the flare 11 has its seat made to abut all over its face against the pressure receiving seat of the partner by the flatness of the conical wall 12, so that its facial pressure is reluctant to rise and feasible to cause a leakage. Moreover, an excessive fastening is invited to prevent the leakage at the mating pressure receiving seat due to a dispersion in the bent shape of the pipe P'. On the other hand, concentrations of fatigue and stress are caused at the neck of the flare 11 due to the structural limitation such as the small thickness of the pipe P' itself and the state of arrangement under vibrations. Thus, the structure of the prior art is frequently troubled by a cracking or breakage.

SUMMARY OF THE INVENTION

The present invention has been conceived in view of the above-specified problems intrinsic to the prior art and has an object to provide a flared structure for an open end of a metal pipe, which has a deformed elastic wall portion formed in the open end: to establish an elastic force for the connection so that a facial pressure is raised to eliminate any excessive fastening force; and to disperse the concentration of stress at the neck of the flare and lighten the fatigue thereby to eliminate cracking and breakage at the neck for a long time.

In order to achieve the above-specified object, according to the present invention, there is provided a flared structure formed at one open end of a metal pipe to be connected to one end of a mating joint, which structure comprises at least one deformed elastic 7all portion formed circumferentially in said open end for establishing an elastic force as said open end is clamped and fastened for effecting the connection. The deformed elastic wall portion is exemplified by an annular constriction or bulge formed in the vicinity of the open end, by an annular rise extending radially outward from the open end, or by one or more annular corrugations formed circumferentially in the vicinity of the open end.

Thanks to this construction, i.e., the structure of the deformed elastic wall portion in the open end according to the present invention, the facial pressure is raised by the elastic force which is established as the pressure receiving face of the joint is fastened by the nut. Even if, therefore, a local pressure is built up at the pressure receiving face, no excessive fastening force is required. At the same time, the concentration of stress can be lightened and effectively dispersed at the neck of the flare. Thus, the fear of cracking and breakage of the neck can be eliminated even if the structure is arranged under vibrations, so that the connection can be maintained stably and reliably for a long time.

DETAILED DESCRIPTION OF THE PREFERRED EMBODIMENTS

Figure 1:
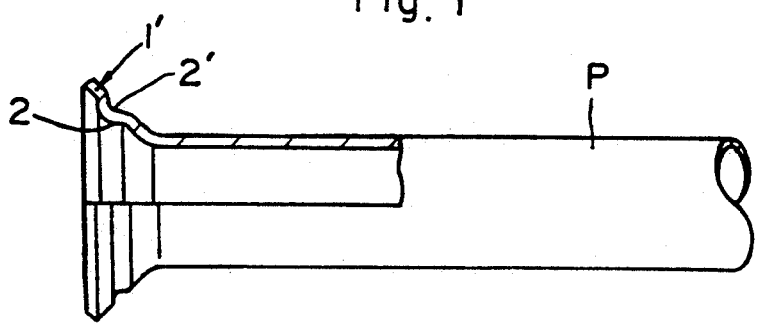
FIG. 1 is a partially cut-away top plan view showing a flared structure in an open end of a pipe.
Figure 2:
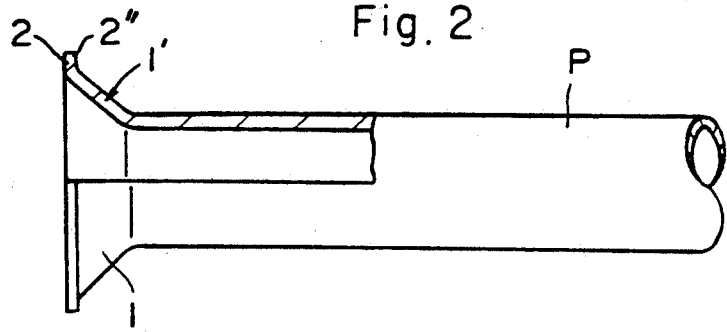
FIG. 2 is similar to FIG. 1 but shows another embodiment.
Figure 3:
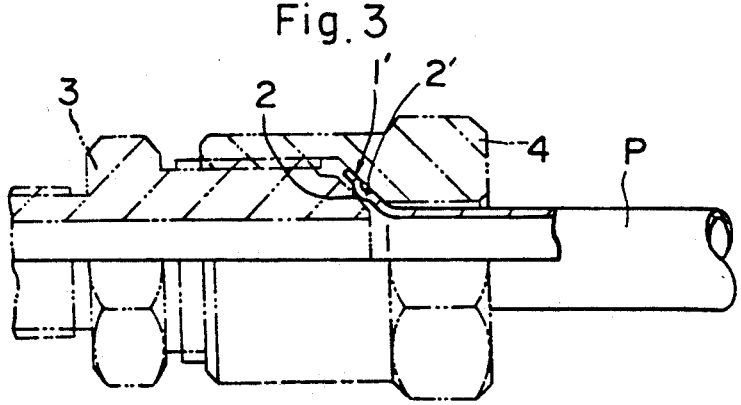
FIG. 3 is a partially cut-away longitudinal section showing the connected state of FIG. 1.
Figure 4:
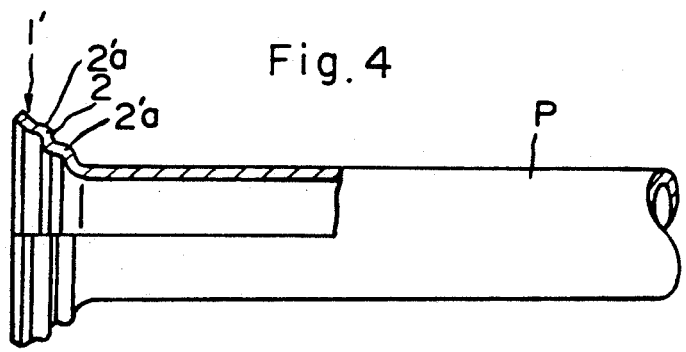
FIG. 4 is similar to FIG. 1 but shows still another embodiment.
Figure 5:
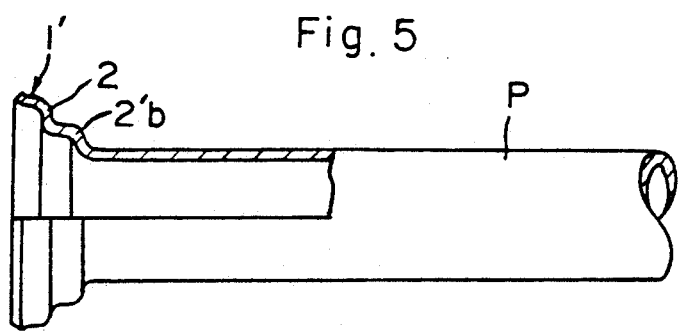
FIG. 5 is similar to FIG. 1 but shows a further embodiment.
Figure 6:
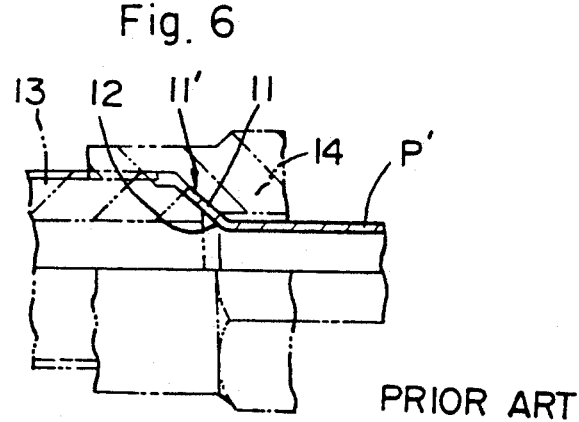
FIG. 6 is a partially cut-away longitudinal section showing the connected state of the connecting flared structure of the prior art.

In FIGS. 1 to 5, reference numeral 1 designates a flare formed at one end of a metal pipe P. This pipe P is flared at 1 to its open end 1' and is formed circumferentially with an deformed elastic wall portion 2 in the vicinity of the open end 1'. This wall portion 2 is exemplified by an annular constriction 2' (as shown in FIG. 1). Alternatively, the wall portion 2 may be exemplified by an annular rise 2" (as shown in FIG. 2) which extends radially outward from the open end 1'. Moreover, the wall portion 2 may be exemplified by one or a plurality of annular bulges 2'a formed in the vicinity of the open end 1', as shown in FIG. 4. For the connection, the deformed elastic wall portion 2 is elastically clamped, as it is fastened, between the pressure receiving face of a mating joint 3 and the pressure face of a nut 4 assembled. If desired, the wall portion 2 can be exemplified by an annular corrugation or corrugations 2'b formed all over the pipe surface toward the open end 1', as shown in FIG. 5.

According to the flared structure of the present invention, as has been described hereinbefore, the flare 1 of the pipe in the vicinity of the open end 1' is merely pressed to form at least one deformed elastic wall portion 2. As a result, the facial pressure of the seat is raised by the elastic force which is established as the open end is fastened. Even if, therefore, a local pressure is built up at the pressure receiving face, no excessive fastening force is required for the nut 4. At the same time, the concentration of stress can be lightened and effectively dispersed at the neck of the flare 1. Thus, the fear of cracking and breakage of the neck can be eliminated even if the structure is arranged under vibrations, so that the connection can be maintained stably and reliably for a long time. Thus, the present invention can provide a remarkably useful flared structure for connecting the open end of a pipe.

What is claimed is:

1. A pipe for leak-free connection between a convex seat of a first mating member and a correspondingly configured concave seat of a second mating member, said pipe having an /utwardly flared connecting end and being of substantially uniform cylindrical shape along portions extending from said connecting end, said pipe and outwardly flared connecting end being defined by inner and outer wall means, said outwardly flared connecting end being characterized by at least one annular deformed portion in said inner and outer wall means extending toward one of said seats and circumferentially around said outwardly flared end, said annular deformed portion being disposed for engagement by said at least one of said seats and being elastically deformable by said seats for increasing facial pressure between the outwardly flared connecting end of the pipe and the first and second mating members.

2. A pipe as in claim 1, wherein the deformed portion defines an annular constriction projecting inwardly on said outwardly flared end of said pipe for engaging the convex seat of said first mating member.

3. A pipe according to claim 1, wherein said annular deformed portion comprises an outwardly deformed annular bulge for engaging the concave seat of the second mating member.

4. A pipe according to claim 1, wherein said outwardly flared end comprises at least one annular constriction extending inwardly on said outwardly flared end and at least one annular bulge projecting outwardly on said outwardly flared end, said constriction and said bulge being engaged respectively by the convex and concave seats of said first and second members.

5. A pipe as in claim 1, wherein said annular deformed portion comprises an annular rise extending outwardly and defining an extreme axial end of said pipe.

6. A pipe as in claim 1, wherein portions of said outwardly flared end adjacent said annular deformed portion are substantially conically generated.

* * * * *